United States Patent [19]
Lougheed et al.

[11] Patent Number: 5,108,251
[45] Date of Patent: Apr. 28, 1992

[54] BOAT LIFT

[76] Inventors: Allen D. Lougheed; Suzanne M. Lougheed, both of R.R. 2, Site 2, Box 10, Leduc, Alberta, Canada, T9E 2X2

[21] Appl. No.: 501,282

[22] Filed: Mar. 29, 1990

[30] Foreign Application Priority Data

Sep. 29, 1989 [CA] Canada .................................. 614875

[51] Int. Cl.⁵ .............................................. B60P 3/10
[52] U.S. Cl. ...................................... 414/546; 414/678
[58] Field of Search ............... 414/462, 546, 551, 555, 414/678

[56] References Cited

U.S. PATENT DOCUMENTS

| | | |
|---|---|---|
| 2,479,035 | 4/1947 | Burkey . |
| 2,486,316 | 10/1949 | Morse et al. . |
| 2,753,063 | 7/1956 | Abel . |
| 2,985,327 | 5/1961 | Gilkison . |
| 3,418,671 | 12/1968 | Marotta ........................ 414/678 X |
| 3,495,729 | 2/1970 | Kruse . |
| 3,519,154 | 7/1970 | Riley . |
| 3,777,922 | 12/1973 | Kirchmeyer . |
| 3,857,248 | 12/1974 | Rutter . |
| 3,905,499 | 9/1965 | Speidel . |
| 3,915,323 | 10/1975 | Underhill . |
| 4,034,879 | 7/1977 | Cudmore ........................... 414/462 |
| 4,113,126 | 9/1978 | Shotwell . |
| 4,139,110 | 2/1979 | Roberts . |
| 4,234,285 | 11/1980 | Martinez . |
| 4,269,561 | 5/1981 | Rutten . |
| 4,531,879 | 7/1985 | Horowitz . |
| 4,594,041 | 6/1986 | Hostetler ........................ 414/555 X |
| 4,765,794 | 8/1988 | Stephens et al. . |
| 4,889,465 | 12/1989 | Brooks ........................... 414/678 X |

FOREIGN PATENT DOCUMENTS

| | | |
|---|---|---|
| 531653 | 10/1956 | Canada . |
| 891894 | 2/1972 | Canada . |
| 994719 | 8/1976 | Canada . |
| 1002910 | 1/1977 | Canada . |
| 1043748 | 12/1978 | Canada . |
| 1081731 | 7/1980 | Canada . |
| 1224187 | 7/1987 | Canada . |
| 2443347 | 4/1980 | France . |
| 2452419 | 10/1980 | France . |
| 1002635 | 8/1965 | United Kingdom ................ 414/546 |

*Primary Examiner*—David A. Bucci
*Assistant Examiner*—Craig Slavin
*Attorney, Agent, or Firm*—Beveridge, DeGrandi & Weilacher

[57] ABSTRACT

A boat lift consisting of a support and a pair of arms aligned in parallel spaced relation. Each of the arms have one end pivotally connected to the support. The arms are movable between a stored position resting substantially horizontally upon the support and an extended position extending substantially horizontally from the support. Chains are used for suspending a boat from the arms. Hydraulic activation cylinders with accompanying guide track are used for moving the arms between the extended position and the stored position.

7 Claims, 9 Drawing Sheets

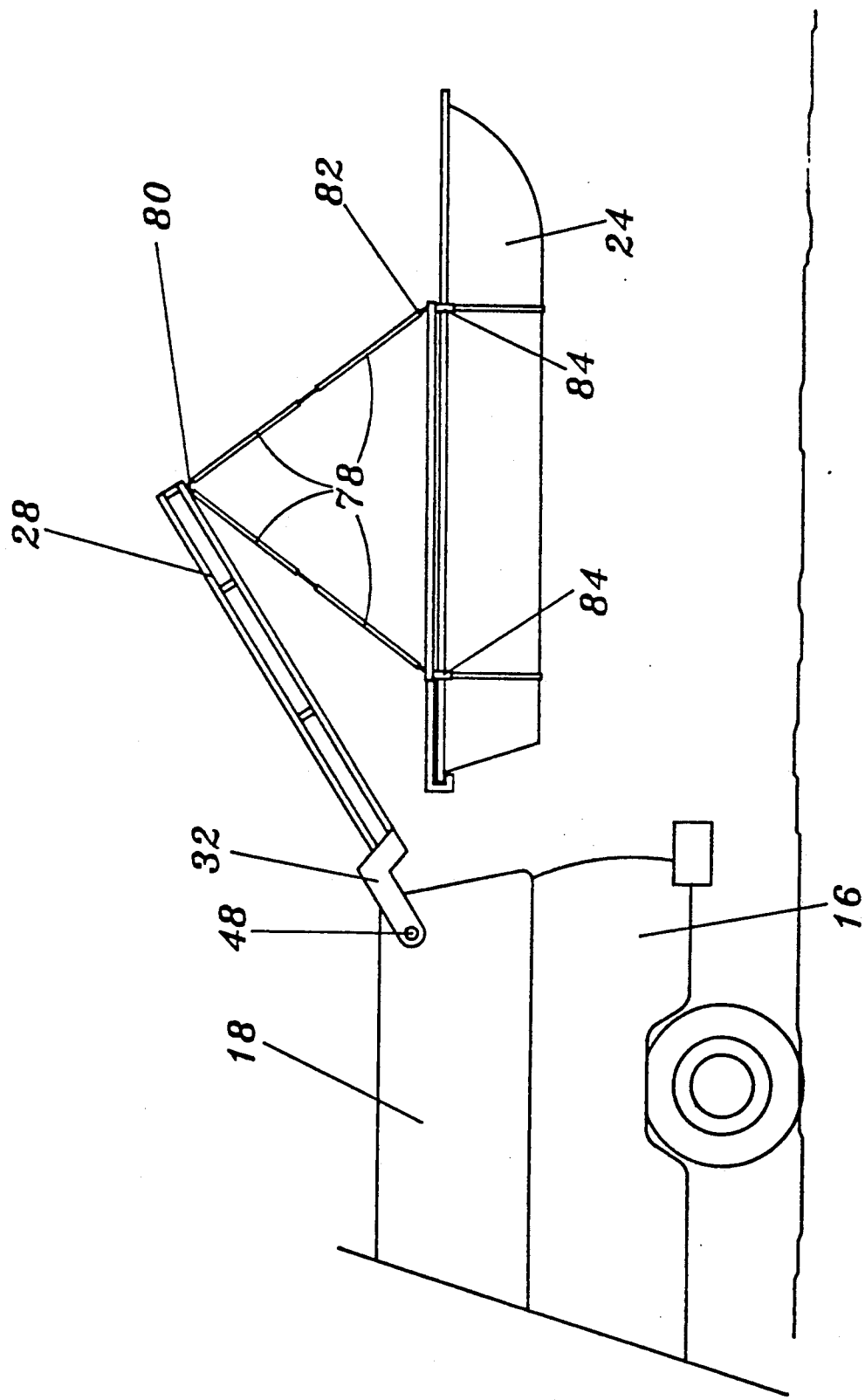

BOAT LIFT

The present invention relates to a boat lift.

BACKGROUND OF THE INVENTION

A number of boat lifts have been designed for transporting boats upon motor vehicles. In order to properly function these boat lifts must be capable of bearing the weight of the boat, must correctly position the boat upon the motor vehicle and must not impede the operation of the motor vehicle. The resulting boat lifts have tended to be complex winch driven mechanisms.

SUMMARY OF THE INVENTION

What is required is an alternate boat lift which will obviate or mitigate the disadvantages in the prior art.

Broadly, the present invention provides a boat lift which is comprised of a support and a pair of arms aligned in parallel spaced relation. Each of the arms have one end pivotally connected to the support. The arms are movable between a stored position resting substantially horizontally upon the support and an extended position extending substantially horizontally from the support. Means is provided for suspending a boat from the arms. Hydraulic activation means is provided for moving the arms between the extended position and the stored position.

By suspending the boat from arms which pivot in excess of 180 degrees the Applicant has resolved the problem of positioning the boat on the motor vehicle and at the same time simplified the boat lift. The boat positions itself as the arms move between the stored and extended positions without the need for guide tracks or other paraphernalia on the motor vehicle. The means by which the boat is suspended from the arms is not critical to the invention and may take a number of alternate forms.

After experimenting with various alternate hydraulic activation mechanisms the Applicant has found that the most beneficial results may be obtained through the use of an hydraulic activation means which is comprised of a pair of stub shafts pivotally connecting the arms to the support. A connector is provided having a first end secured to one of the shafts and a second end. An activating linkage is provided having a first end secured to the second end of the connector, and a second end with a protruding pin. An hydraulic cylinder is provided having a first end affixed to the support and a second end connected to the second end of the activating linkage. A track is mounted on the support which engages the protruding pin of the activating linkage. The track defines a dogleg path with a first leg and a second leg. Means is provided for connection to an hydraulic pump. Upon activation of the pump the hydraulic cylinder exerts a force upon the activating linkage to move the protruding pin along the first leg of the track resulting in the connector rotating the shaft sufficient to move the arms from an extended position to a substantially vertical position. Upon continued force being exerted by the hydraulic cylinder upon the activating linkage the protruding pin is moved along the second leg of the track resulting in the connector rotating the shaft sufficient to move the arms from a substantially vertical position to a stored position.

Although beneficial results may be obtained through the use of the boat lift as described, even more beneficial results may be obtained by having the hydraulic activation means connected to an hydraulic fluid pump of a motor vehicle. This form of connection eliminates the need for a separate pump for the boat lift.

BRIEF DESCRIPTION OF THE DRAWINGS

These and other features of the invention will become more apparent from the following description in which reference is made to the appended drawings, wherein:

FIG. 8 is a side elevation view of an alternate embodiment of the boat lift.

DETAILED DESCRIPTION OF THE PREFERRED EMBODIMENT

Figure 1:
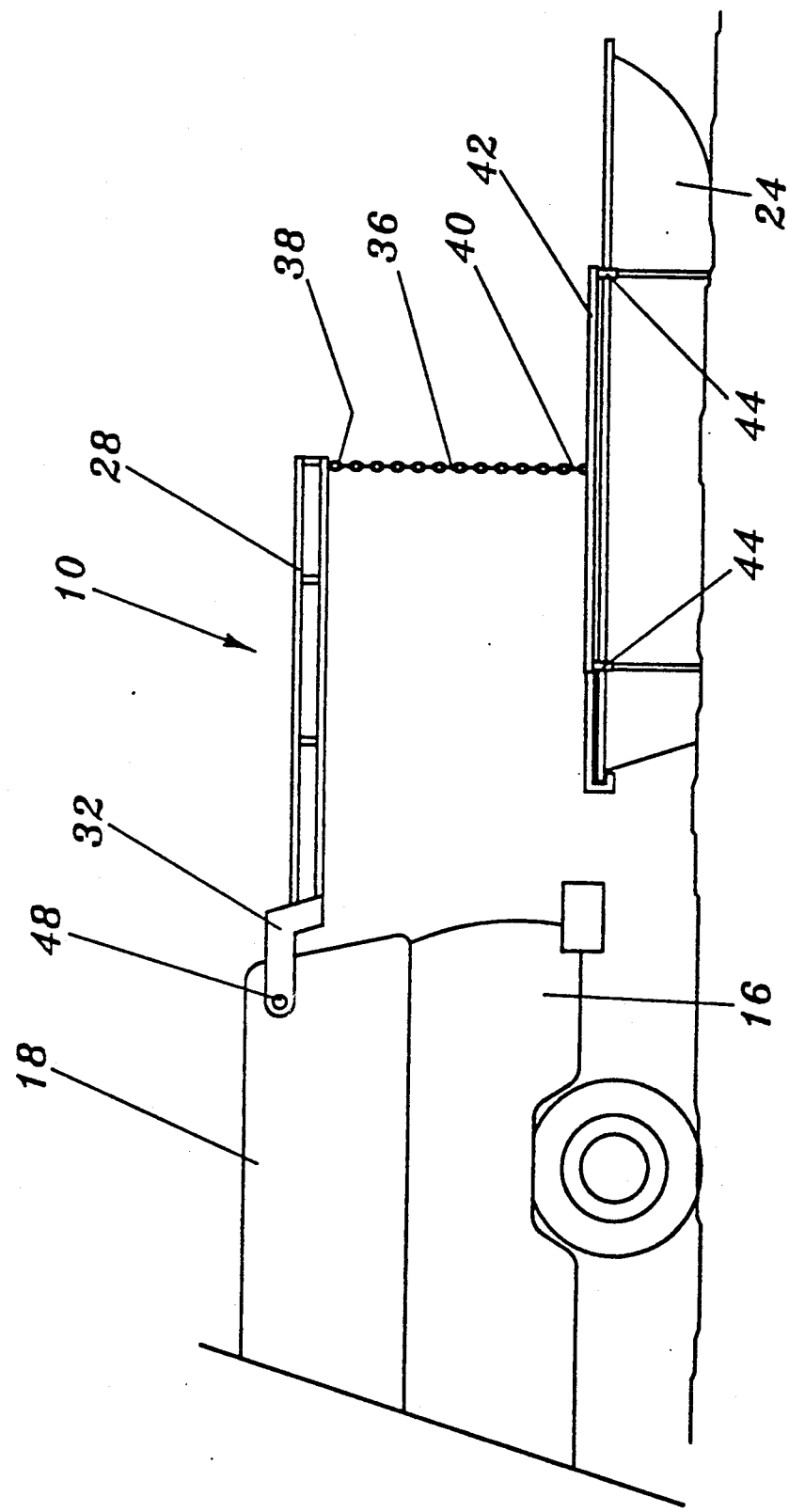
FIG. 1 is a side elevation view of a preferred embodiment of the invention in a first position.
Figure 2:
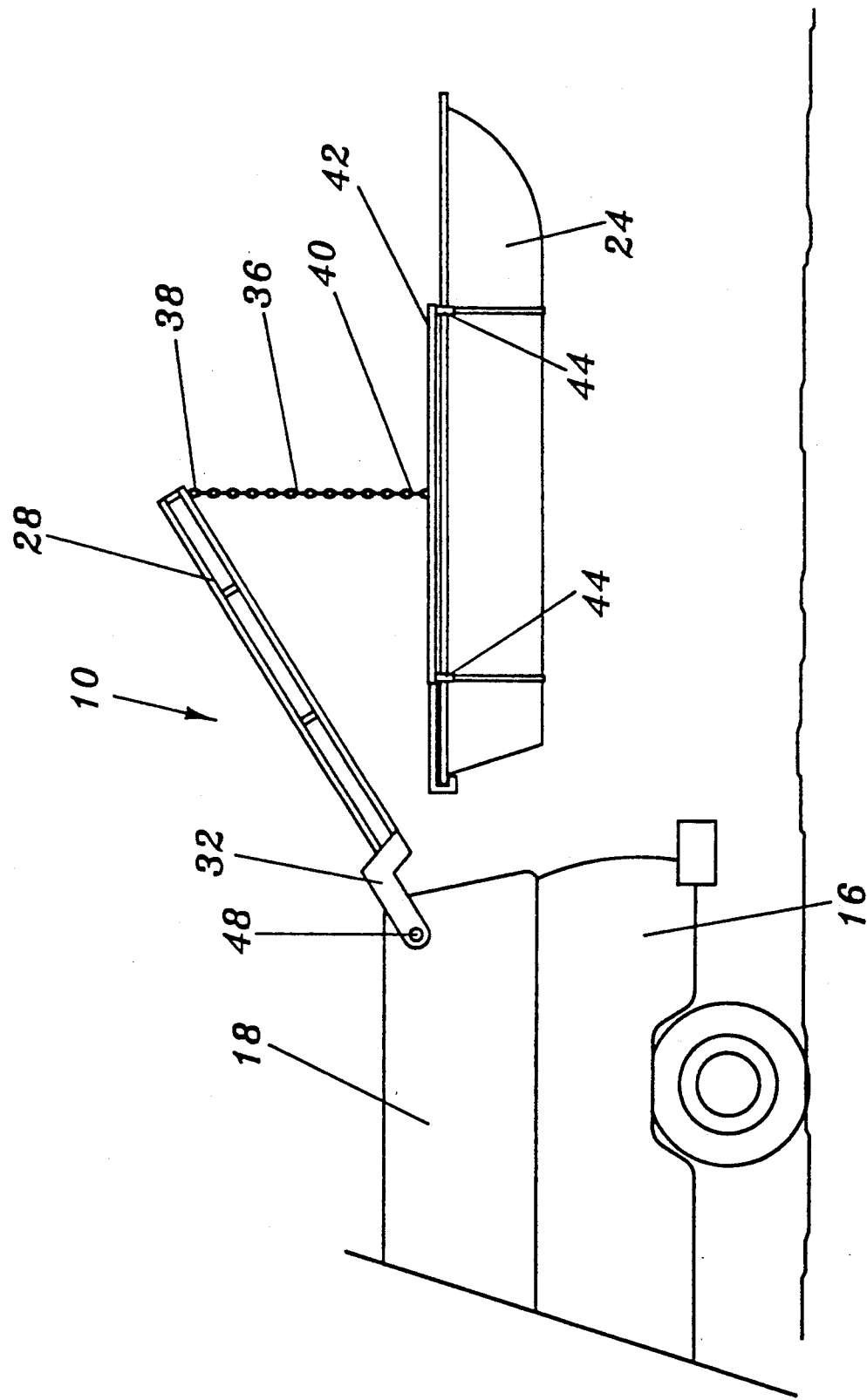
FIG. 2 is a side elevation view of the boat lift illustrated in FIG. 1 in a second position.
Figure 3:
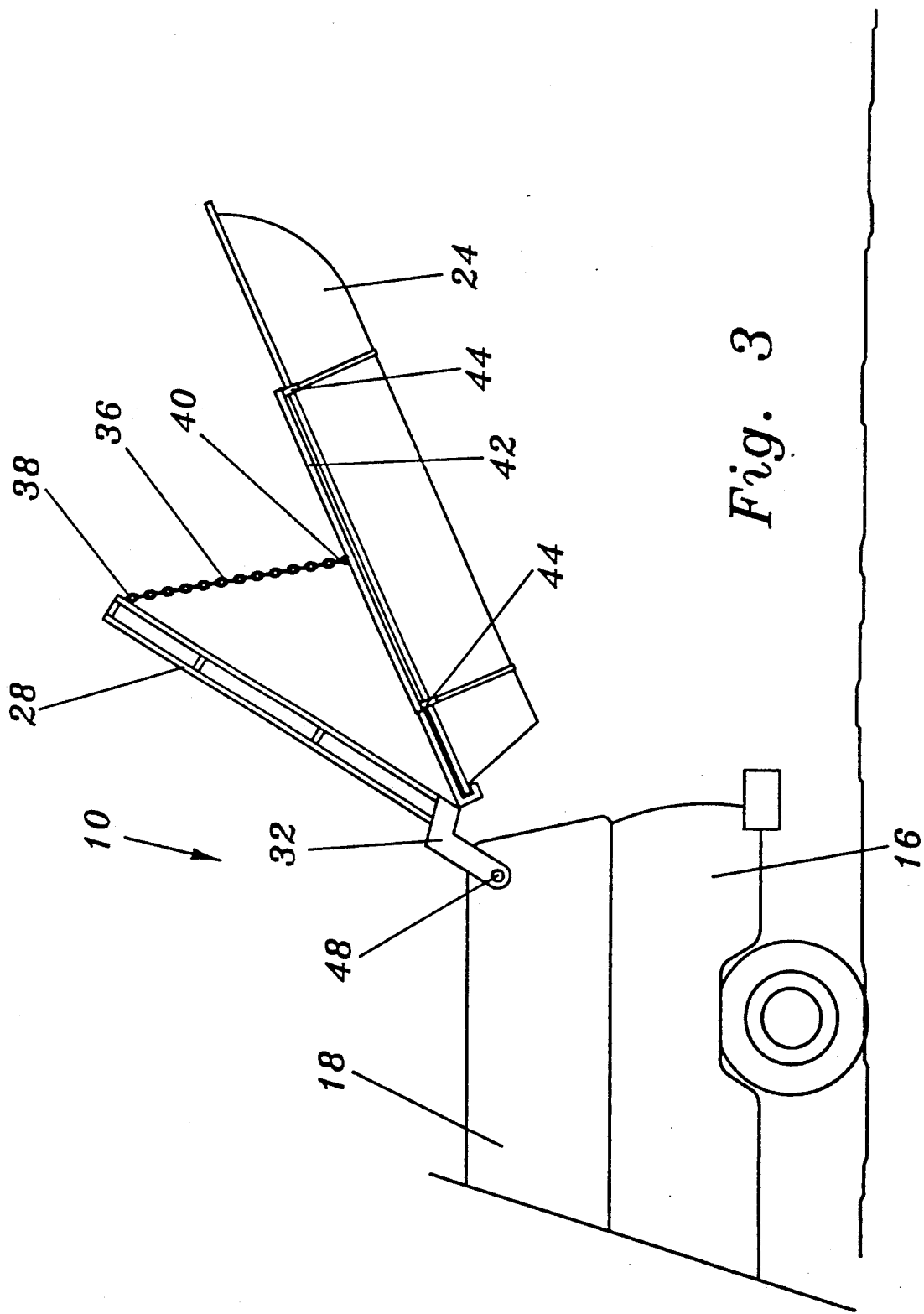
FIG. 3 is a side elevation view of the boat lift illustrated in FIG. 1 in a third position.

The preferred embodiment will now be described with reference to FIGS. 1 through 7. The preferred embodiment, generally designated by reference numeral 10, is a boat lift.

Figure 4:
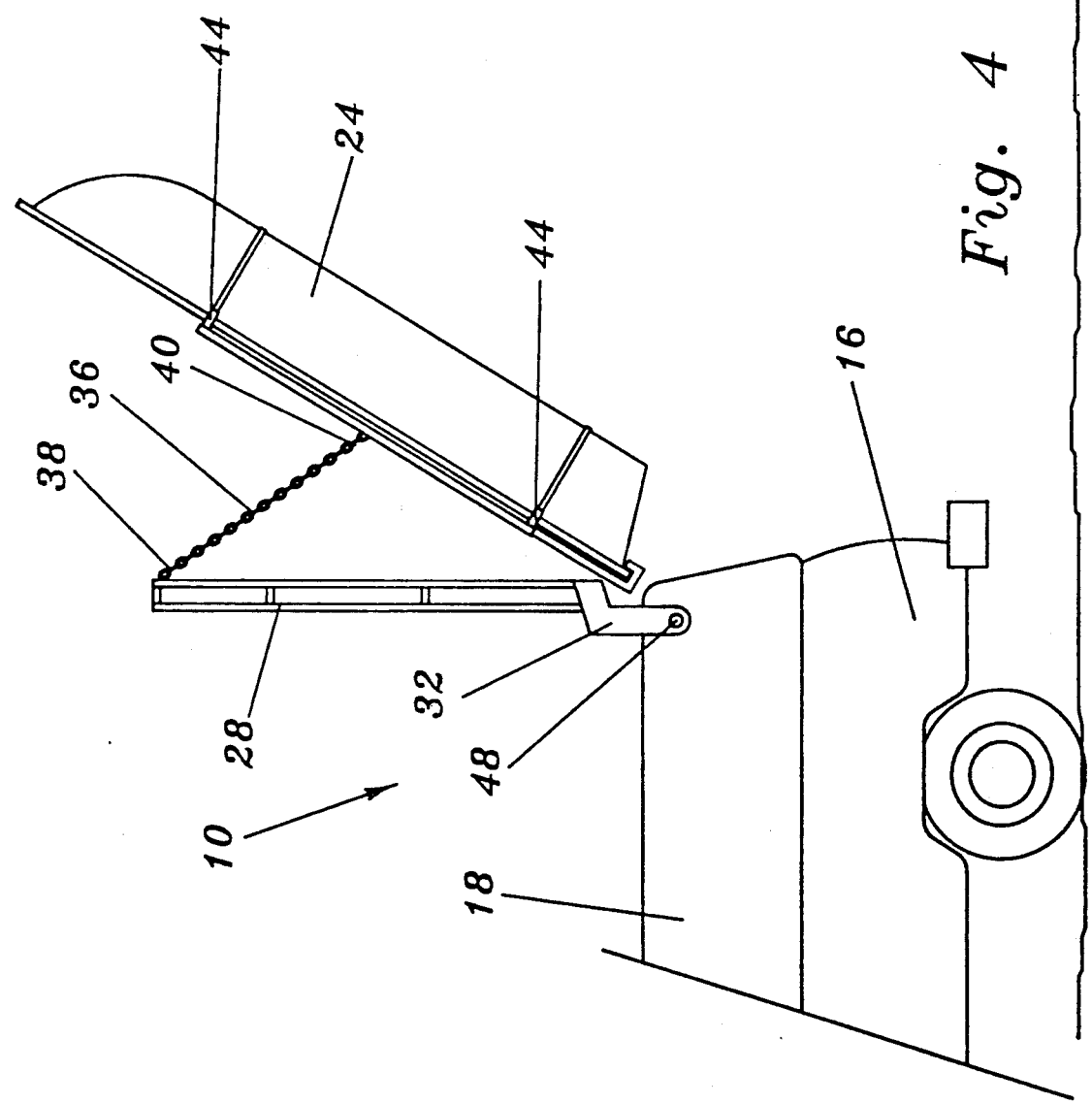
FIG. 4 is a side elevation view of the boat lift illustrated in FIG. 1 in a fourth position.
Figure 5:
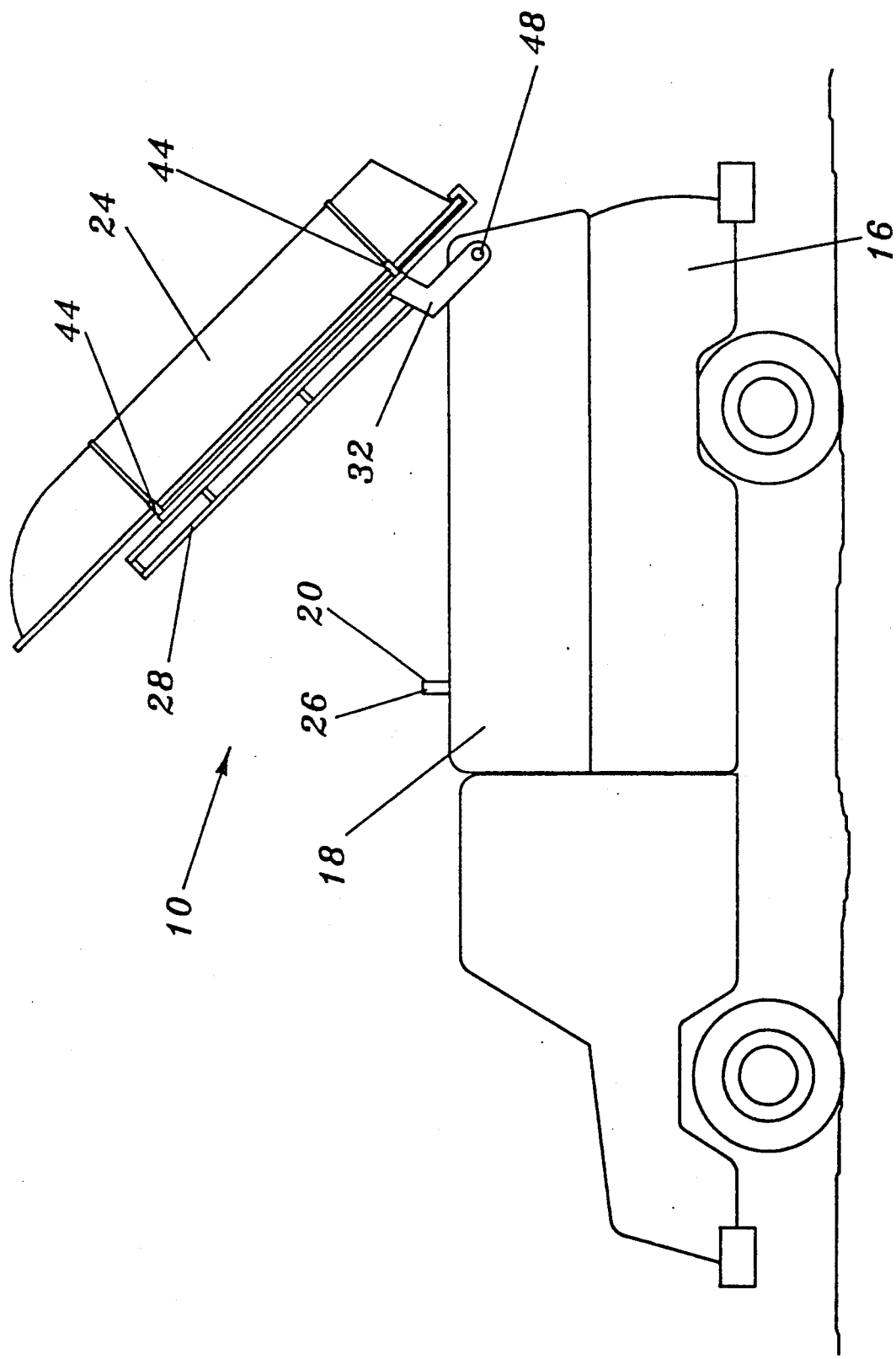
FIG. 5 is a side elevation view of the boat lift illustrated in FIG. 1 in a fifth position.

Referring to FIGS. 1 through 6, boat lift 10 has a support structure 12 consisting of a frame which is intended to be mounted in a freight box 14 of a truck 16. Support structure 12 is intended to be covered by a truck canopy 18 in order that the use of truck 16 as a recreational vehicle is not affected. Support structure 12 has a first end 20 and a second end 22. Truck canopy 18 does not have the strength to support the weight of a large boat, such as boat 24. For this reason, two extensions 26 extend through truck canopy 18 at first end 20 of support structure 12, as is illustrated in FIG. 5. A pair of arms 28 have one end 32 pivotally connected to second end 22 of support structure 12. Arms 28 are aligned in parallel spaced relation and movable between a stored position resting substantially horizontally across support structure 12 to engage extensions 26 and an extended position extending substantially horizontally from support structure 12. Chains 34 are provided having a first end 38 secured to arms 28 and a second end 40. A rectangular frame 42 is suspended from second end 40 of chains 34 and 36. Frame 42 has two depending yokes 44, whereby boat 24 is be secured to frame 42. A Hydraulic activation mechanism 46 is provided for moving arms 28 between the extended position and the stored position.

Figure 7:
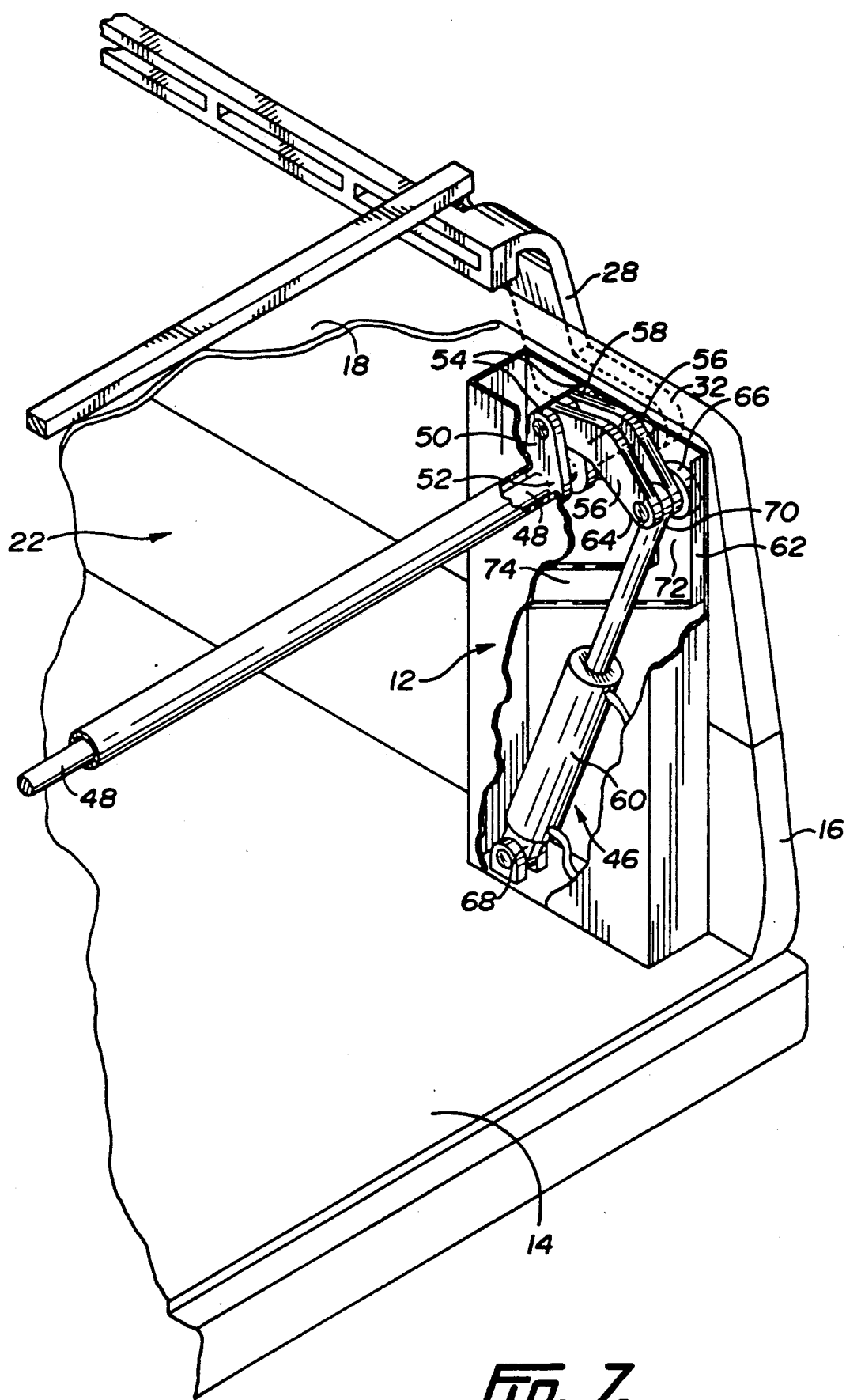
FIG. 7 is a detailed view of the hydraulic activation mechanism used with the preferred embodiment of the invention.
Figure 7A:
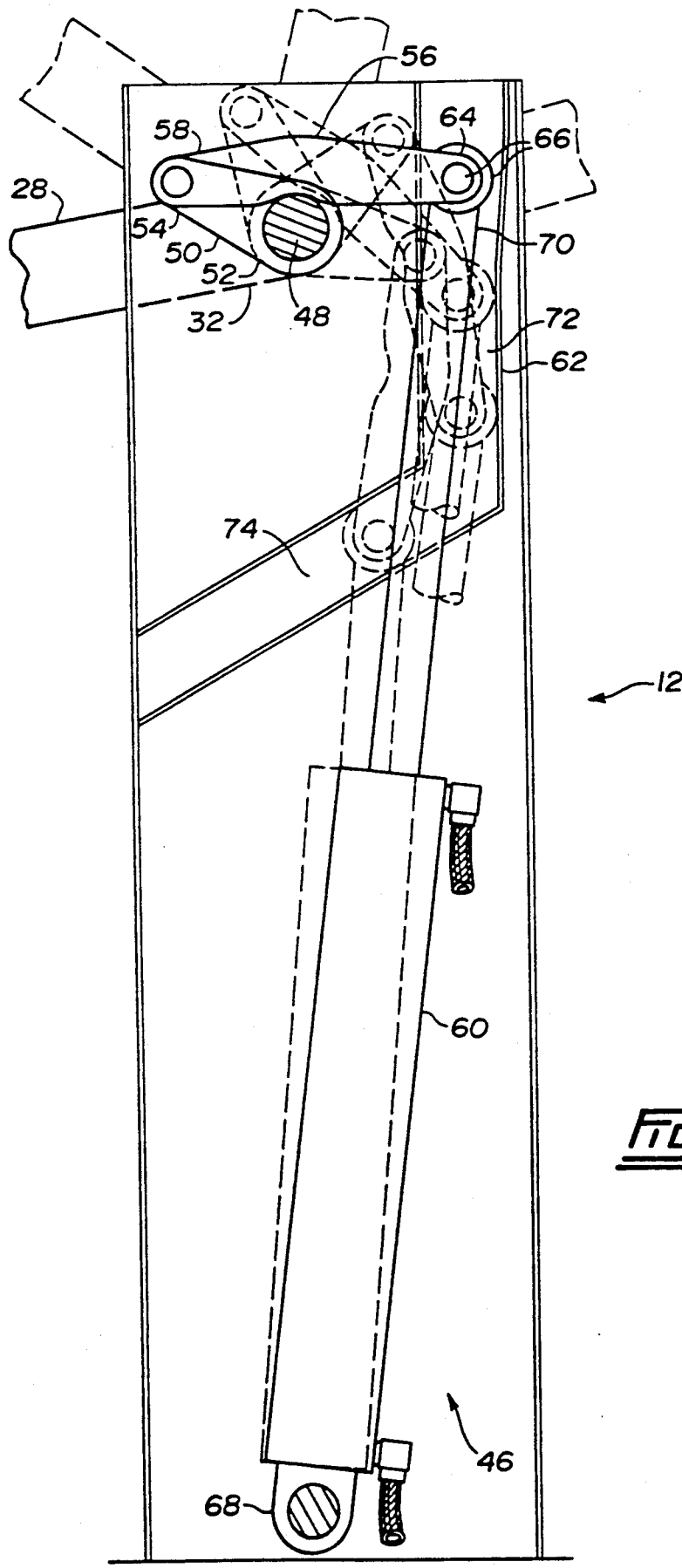
FIG. 7a is a detailed side elevation view of the activation mechanism.

Referring to FIG. 7, the primary components of hydraulic activation mechanism 46 are a stub shaft 48, a connector 50, an activating linkage 56, an hydraulic cylinder 60, and a track 62. Stub shaft 48 pivotally connects end 32 of arms 28 to support structure 12. Connector 50 has a first end 52 secured to shaft 48 and a second end 54. Activating linkage 56 has a first end 58 secured to second end 54 of connector 50, and a second end 64 with a protruding pin 66. Hydraulic cylinder 60 has a first end 68 affixed to support structure 12 and a second end 70 connected to second end 64 of activating linkage 56. Track 62 is mounted on support structure 12. Track 62 engages protruding pin 66 of activating linkage 56. Track 62 has a dogleg path with a first leg 72 and a second leg 74. An hydraulic fluid line (not shown) connects hydraulic cylinder 60 to an hydraulic pump (not shown) in truck 16.

Figure 6:
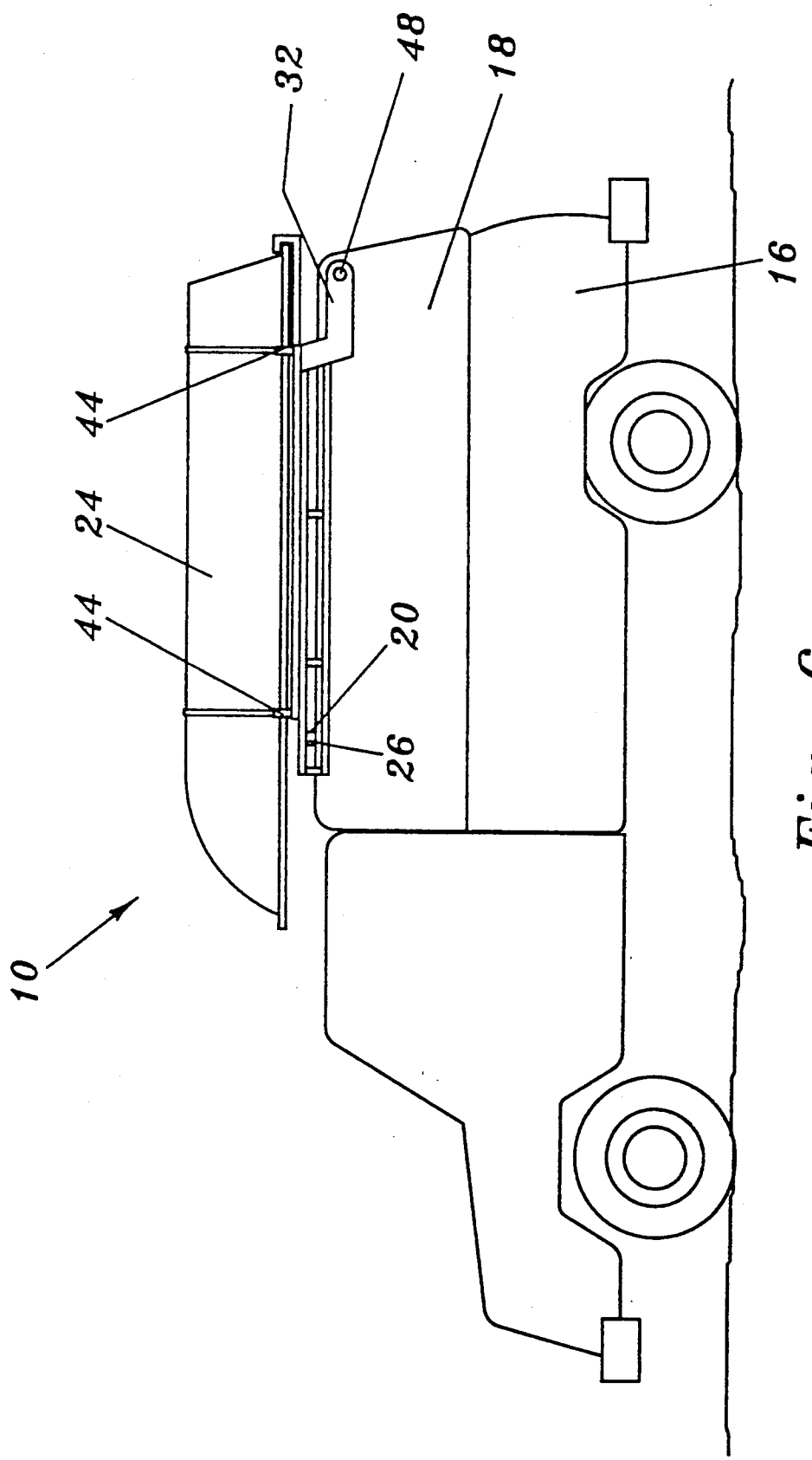
FIG. 6 is a side elevation view of the boat lift illustrated in FIG. 1 in a sixth position.

The use and operation of boat lift 10 will now be described with reference to FIGS. 1 through 7. Upon activation of the hydraulic pump (not shown) in truck 16, hydraulic cylinder 60 exerts a force upon activating linkage 56 to move protruding pin 66 along first leg 72 of track 62. The movement of activating linkage 56 results in a corresponding movement of connector 50 rotating shaft 48 sufficient to move arms 28 from an extended position, as illustrated in FIG. 1, to a substantially vertical position, as illustrated in FIG. 4. Upon continued force being exerted by hydraulic cylinder 60 upon activating linkage 56 protruding pin 66 is moved along second leg 74 of track 62. The movement of activating linkage 56 results in a corresponding movement of connector 50 rotating shaft 48 sufficient to move arms 28 from a substantially vertical position, as illustrated in FIG. 4 to a stored position, as illustrated in FIG. 6.

The self positioning aspects of boat lift 10 can be noted by examining the sequence of illustrations in FIGS. 1 through 6. As boat 24 is suspended by chains 34, the positioning of boat 24 relative to arms 28 changes as arms 28 move in excess of 180 degrees from an extended position to a stored position. There is a gradual shifting of boat 24 toward end 32 of arms 28 as boat 24 approaches the stored position. It is important that boat 24 be suspended, but as an examination of FIG. 8 demonstrates there are alternate ways in which this may be accomplished. Referring to FIG. 8, a series of articulated rods 78 are substituted for chains 34. Each of rods 78 has a first end 80 and a second end 82, which are pivotally secured to the adjoining component.

Although not illustrated in the drawings the Applicant recommends that an isolation valve be placed on hydraulic fluid line (not shown) in order to disconnect boat lift 10 from the hydraulic system of truck 16 when the vehicle is in motion. The Applicant also uses turnbuckle turndowns to secure arms 28 and 30 in a stored position prior to proceeding on the highway. The Applicant also uses a manual activation switch in order that boat lift 10 may be operated by a person standing at the rear of truck 16 with a full view of boat 24. It is preferable that frame 42 have a perpendicular end portion 86, which engages boat 24 to prevent it from sliding out of yokes 44 when frame 42 is inverted. Frame 42 is not essential to the operation of the invention, as clamps can be attached directly to boat 24.

It will be apparent to one skilled in the art that modifications may be made to the preferred embodiment without departing from the spirit and scope of the invention. In particular, modifications may be made in the manner boat 24 is suspended from arms 28, as demonstrated in FIG. 8.

The embodiments of the invention in which an exclusive property or privilege is claimed are defined as follows:

1. A boat lift, comprising:
   a. a support;
   b. a pair of arms aligned in parallel spaced relation, each of the arms having one end pivotally connected to the support; the arms being movable between a stored position resting substantially horizontally upon the support and an extended position extending substantially horizontally from the support;
   c. means for suspending a boat from the arms; and
   d. hydraulic activation means for moving the arms between the extended position and the stored position, the hydraulic activation means comprising
      i. a pair of stub shafts pivotally connecting the arms to the support;
      ii. a connector having a first end secured to one of the shafts and a second end;
      iii. an activating linkage having a first end secured to the second end of the connector, and a second end with a protruding pin;
      iv. an hydraulic cylinder having a first end affixed to the support and a second end connected to the second end of the activating linkage;
      v. a track mounted on the support which engages the protruding pin of the activating linkage, the track defining a dogleg path with a first leg and a second leg; and
      vi. means for connection to an hydraulic pump, such that upon activation of the pump the hydraulic cylinder exerts a force upon the activating linkage to move the protruding pin along the first leg of the track resulting in the connector rotating the shaft sufficient to move the arms from an extended position to a substantially vertical position, and upon continued force being exerted by the hydraulic cylinder upon the activating linkage the protruding pin is moved along the second leg of the track resulting in the connector rotating the shaft sufficient to move the arms from a substantially vertical position to a stored position.

2. A boat lift as defined in claim 1, the means for suspending a boat from the arms being rods, each of the rods having a first end pivotally secured to the arms, and a second pivotally secured to means for attachment to a boat.

3. A boat lift as defined in claim 1, the means for suspending a boat from the arms being chains, each of the chains having a first end secured to the arms, and a second secured to means for attachment to a boat.

4. A boat lift as defined in claim 2 or 3, the means for attachment to a boat being clamps.

5. A boat lift as defined in claims 2 or 3, the means for attachment to a boat being a frame with two depending yokes.

6. A boat lift as defined in claim 1, the hydraulic activation means being connected to an hydraulic fluid pump of a motor vehicle.

7. A boat lift, comprising:
   a. a support;
   b. a pair of arms aligned in parallel spaced relation, each of the arms having one end pivotally connected to the support; the arms being movable between a stored position resting substantially horizontally upon the support and an extended position extending substantially horizontally from the support;
   c. chains having a first end secured to the arms, and a second end;
   d. a frame suspended from the second end of the chains, the frame having two depending yokes whereby a boat may be secured to the frame; and e. hydraulic activation means for moving the arms between the extended position and the stored position, comprising:
  i. a pair of stub shafts pivotally connecting the arms to the support;
  ii. a connector having a first end secured to one of the shafts and a second end;
  iii. an activating linkage having a first end secured to the second end of the connector, and a second end with a protruding pin;
  iv. an hydraulic cylinder having a first end affixed to the support and a second end connected to the second end of the activating linkage;
  v. a track mounted on the support which engages the protruding pin of the activating linkage, the track defining a dogleg path with a first leg and a second leg; and
  vi. an hydraulic fluid line for connection of the hydraulic cylinder to an hydraulic pump in a motor vehicle to which the support is secured, such that upon activation of the pump the hydraulic cylinder exerts a force upon the activating linkage to move the protruding pin along the first leg of the track resulting in the connector rotating the shaft sufficient to move the arms from an extended position to a substantially vertical position, and upon continued force being exerted by the hydraulic cylinder upon the activating linkage the protruding pin is moved along the second leg of the track resulting in the connector rotating the shaft sufficient to move the arms from a substantially vertical position to a stored position.

* * * * *